United States Patent
Akutsu et al.

(10) Patent No.: US 11,041,058 B2
(45) Date of Patent: Jun. 22, 2021

(54) RESIN STRUCTURE HAVING A LIQUID LAYER ON THE SURFACE THEREOF

(71) Applicant: TOYO SEIKAN GROUP HOLDINGS, LTD., Tokyo (JP)

(72) Inventors: Yosuke Akutsu, Yokohama (JP); Shinya Iwamoto, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 70 days.

(21) Appl. No.: 14/904,485

(22) PCT Filed: Jul. 24, 2014

(86) PCT No.: PCT/JP2014/069582
§ 371 (c)(1),
(2) Date: Jan. 12, 2016

(87) PCT Pub. No.: WO2015/012358
PCT Pub. Date: Jan. 29, 2015

(65) Prior Publication Data
US 2016/0152786 A1    Jun. 2, 2016

(30) Foreign Application Priority Data

Jul. 26, 2013 (JP) .............................. JP2013-156008
Jan. 16, 2014 (JP) .............................. JP2014-006083

(51) Int. Cl.
*C08J 7/04* (2020.01)
*C08J 7/06* (2006.01)
(Continued)

(52) U.S. Cl.
CPC ............... *C08J 7/048* (2020.01); *B32B 3/266* (2013.01); *B32B 27/08* (2013.01); *B32B 27/20* (2013.01);
(Continued)

(58) Field of Classification Search
CPC ...... B65D 1/0207; B65D 85/72; B65D 23/02; B65D 23/04; B65D 25/14; B32B 3/30; B32B 2307/746
(Continued)

(56) References Cited

U.S. PATENT DOCUMENTS 5,426,916 A * 6/1995 Grigsby .................... B32B 3/12
 264/211
8,535,779 B1 * 9/2013 Smith .................... B65D 23/02
 428/141
(Continued)

FOREIGN PATENT DOCUMENTS

CN    101563301 A    10/2009
CN    104540747 A    4/2015
(Continued)

OTHER PUBLICATIONS

Synquest Laboratories, Perfluorotripentylamine Safety Data Sheet, 2016, Synquest Laboratories, p. 3 (Year: 2016).*
(Continued)

*Primary Examiner* — Lee E Sanderson
*Assistant Examiner* — Michael C Romanowski
(74) *Attorney, Agent, or Firm* — Sughrue Mion, PLLC (57) ABSTRACT

A resin structure comprising a resin formed body (1) and a liquid layer (3) formed on a surface of the resin formed body (1), the liquid layer (3) having liquid protrusions (3a) that are locally protruded on the surface thereof. The structure exhibits improved properties on the surface of the resin formed body (1), such as improved sliding property and non-adhesiveness to various substances maintaining stability as a result of forming the liquid layer (3).

6 Claims, 4 Drawing Sheets

(51) Int. Cl.

| | | |
|---|---|---|
| *B65D 23/02* | (2006.01) | |
| *B65D 23/04* | (2006.01) | |
| *B65D 85/72* | (2006.01) | |
| *C08J 7/048* | (2020.01) | |
| *B65D 1/02* | (2006.01) | |
| *B32B 27/30* | (2006.01) | |
| *B32B 27/20* | (2006.01) | |
| *B32B 27/32* | (2006.01) | |
| *B32B 3/26* | (2006.01) | |
| *B32B 27/08* | (2006.01) | |
| *C08J 7/043* | (2020.01) | |
| *C08J 7/046* | (2020.01) | |

(52) U.S. Cl.
CPC ............ *B32B 27/308* (2013.01); *B32B 27/32* (2013.01); *B65D 1/0215* (2013.01); *C08J 7/043* (2020.01); *C08J 7/046* (2020.01); *C08J 7/065* (2013.01); *B32B 2264/102* (2013.01); *B32B 2439/70* (2013.01); *C08J 2323/06* (2013.01); *C08J 2423/06* (2013.01); *C08J 2433/12* (2013.01)

(58) Field of Classification Search
USPC ................ 428/35.7, 36.9, 36.91, 34.1–36.92
See application file for complete search history.

(56) References Cited

U.S. PATENT DOCUMENTS

| | | | |
|---|---|---|---|
| 2003/0096083 A1* | 5/2003 | Morgan .................. | B08B 17/06 428/141 |
| 2009/0304996 A1 | 12/2009 | Kishikawa et al. | |
| 2010/0092621 A1 | 4/2010 | Akutsu et al. | |
| 2011/0220664 A1 | 9/2011 | Sant et al. | |
| 2012/0118886 A1* | 5/2012 | Sekiguchi ............... | B32B 27/06 220/200 |
| 2013/0032316 A1* | 2/2013 | Dhiman ................ | B08B 17/065 165/133 |
| 2013/0034695 A1 | 2/2013 | Smith et al. | |
| 2014/0023753 A1 | 1/2014 | Akutsu et al. | |
| 2014/0106103 A1 | 4/2014 | Arakawa et al. | |
| 2014/0147627 A1 | 5/2014 | Aizenberg et al. | |
| 2014/0187666 A1 | 7/2014 | Aizenberg et al. | |
| 2014/0290731 A1 | 10/2014 | Aizenberg et al. | |
| 2014/0290732 A1 | 10/2014 | Aizenberg et al. | |
| 2014/0314975 A1* | 10/2014 | Smith ..................... | B29C 39/10 428/34.1 |
| 2014/0332570 A1 | 11/2014 | Akutsu et al. | |
| 2015/0017334 A1 | 1/2015 | Sekiguchi et al. | |
| 2015/0041465 A1 | 2/2015 | Komatsu et al. | |
| 2015/0108032 A1 | 4/2015 | Akutsu et al. | |
| 2015/0353271 A1 | 12/2015 | Akutsu et al. | |
| 2015/0360820 A1 | 12/2015 | Akutsu et al. | |
| 2016/0075117 A1 | 3/2016 | Akutsu et al. | |

FOREIGN PATENT DOCUMENTS

| | | |
|---|---|---|
| CN | 104981407 A | 10/2015 |
| CN | 104995103 A | 10/2015 |
| CN | 105246688 A | 1/2016 |
| JP | 8-113244 A | 5/1996 |
| JP | 2001-200281 A | 7/2001 |
| JP | 2007-284066 A | 11/2007 |
| JP | 2008-222291 A | 9/2008 |
| JP | 2009-214914 A | 9/2009 |
| JP | 2010-254377 A | 11/2010 |
| JP | 2011-251519 A | 12/2011 |
| JP | 4878650 B1 | 2/2012 |
| JP | 2013-71336 A | 4/2013 |
| WO | 2009/133645 A1 | 11/2009 |
| WO | 2012/100099 A2 | 7/2012 |
| WO | 2012/100100 A2 | 7/2012 |
| WO | 2012137755 A1 | 10/2012 |
| WO | 2013/002073 A1 | 1/2013 |
| WO | 2013/022467 A2 | 2/2013 |
| WO | 2013/054616 A1 | 4/2013 |
| WO | 2013077380 A1 | 5/2013 |

OTHER PUBLICATIONS

3M, Fluorinert Electronic Liquid FC-70 Product Information, 2000, 3M Performance Materials, p. 1 (Year: 2000).*
Bentley Mills. Admin, and Admin. "Vinyl". Feb. 20, 2014, www.bentleymills.com/knowledge_base/vinyl/. (Year: 2014).*
Poly(Vinyl Chloride), Jan. 8, 2016, polymerdatabase.com/polymers/polyvinylchloride.html. (Year: 2016).*
Communication dated May 19, 2017, from the State Intellectual Property Office of People's Republic of China in counterpart Application No. 201480042212.4.
Communication dated May 2, 2017, from the Japanese Patent Office in counterpart Japanese application No. 2014-260303.
Communication dated Sep. 26, 2016 from the State Intellectual Property Office of the P.R.C. in counterpart application No. 201480042212.4.
Austin Carr, "MIT's Freaky Non-Stick Coating Keeps Ketchup Flowing", Fast Company, May 24, 2012.
Sushant Anand, et al., "Droplet condensation and growth on nanotextured surfaces impregnated with an immiscible liquid", Bulletin of the American Physical Society, APS March Meeting 2012, vol. 57, No. 1, The American Physical Society Mar. 1, 2012 (one page Abstract).
Nancy W. Stauffer, "Novel slippery surfaces: Improving steam turbines and ketchup bottles", MIT Energy Initiative, Jun. 20, 2013.
Michael Nosonovsky, "Materials Science: Slippery when wetted", Nature, Sep. 22, 2011, pp. 412-413, vol. 477, No. 7365.
Tak-Sing Wong, et al., "Bioinspired self-repairing slippery surfaces with pressurestable omniphobicity", Nature, Sep. 22, 2011, pp. 443-447, vol. 477, No. 7365.
International Search Report of PCT/JP2014/069582 dated Sep. 2, 2014 [PCT/ISA/210].
Communication dated Jan. 23, 2017, issued by the European Patent Office in corresponding European Application No. 14829312.9.
Communication dated Dec. 19, 2018, issued by the Canadian Intellectual property Office in corresponding Application No. 2,989,148.

* cited by examiner

RESIN STRUCTURE HAVING A LIQUID LAYER ON THE SURFACE THEREOF

CROSS REFERENCE TO RELATED APPLICATIONS

This application is a National Stage of International Application No. PCT/JP2014/069582, filed Jul. 24, 2014, claiming priority based on Japanese Patent Application Nos. 2013-156008, filed Jul. 26, 2013 and 2014-006083, filed Jan. 16, 2014, the contents of all of which are incorporated herein by reference in their entirety.

TECHNICAL FIELD

This invention relates to a resin structure having a liquid layer formed on the surface thereof.

BACKGROUND ART

Plastic containers are easy to form, can be inexpensively produced and have, therefore, been widely used in a variety of applications. Specifically, olefin resin containers of the shape of bottles formed by the direct blow-forming and of which the inner wall surfaces are formed by using an olefin resin such as low-density polyethylene, have been desirably used as containers for containing viscous slurry-like or paste-like fluid contents such as ketchup and the like from such a standpoint that the contents can be easily squeezed out.

Further, the bottles containing viscous contents are, in many cases, preserved in an inverted state to quickly discharge the contents or to use the contents to the last drop without leaving them in the bottle. It is, therefore, desired that when the bottle is inverted, the viscous content quickly falls down without adhering or staying on the inner wall surface of the bottle.

To satisfy such requirements, for example, a patent document 1 proposes a bottle of a multilayered structure of which the innermost layer is formed of an olefin resin having an MFR (melt flow rate) of not less than 10 g/10 min.

The innermost layer of this multilayered bottle has excellent wettability for the oily content. Therefore, if the bottle is inverted or is tilted, then the oily content such as mayonnaise or the like falls down spreading along the surface of the innermost layer and can be completely discharged without adhering or remaining on the inner wall surface of the bottle (on the surface of the innermost layer).

As for the bottles for containing viscous non-oily contents in which plant fibers are dispersed in water like ketchup, a patent document 2 and a patent document 3 are disclosing polyolefin resin bottles having an innermost layer which is blended with a saturated or unsaturated aliphatic amide as a lubricating agent.

The above patent documents 1 to 3 are all trying to improve sliding property of the plastic containers for the contents based on the chemical compositions of the thermoplastic resin layers forming the inner surfaces of the containers, and are achieving improvements in the sliding property to some extent. However, limitation is imposed on improving the sliding property due to limitation on the kinds of the thermoplastic resins that are used and on the additives, and striking improvement has not been achieved yet.

Under the above circumstances, therefore, study has recently been forwarded in an effort to improving the sliding property even from the physical point of view.

For instance, a patent document 4 is proposing a container in which hydrophobic fine oxide particles having an average primary particle diameter of 3 to 100 nm are deposited on the inner surface thereof.

Further, a patent document 5 is proposing a lid forming on the surface thereof a water-repellent film of a structure in which fine oxide particles having an average particle size of 5 nm to 100 nm are dispersed and adhered on the surface of a resin film formed by using resin particles of an average particle diameter of 1 μm to 20 μm.

According to the art proposed in the patent document 5, the surface to which the content comes in contact is formed to be finely rugged so as to express water-repelling property (hydrophobic property). Namely, in addition to the hydrophobic property of the material forming the rugged surface, a pneumatic layer is formed in the gaps in the rugged surface, the pneumatic layer producing larger water-repelling property than that of the material that is forming the container. This enhances non-adhesiveness to the aqueous contents.

However, though the finely rugged surface enhances non-adhesiveness to the aqueous contents, water very tends to be condensed in the dented portions in the finely rugged surface if the content comes in contact with the finely rugged surface at all times arousing a problem in that the dents are filled with the condensed water. Therefore, it is desired to further improve the sliding property.

Further, the present inventors are proposing plastic containers or resin structures forming a liquid layer on the surfaces thereof (e.g., see JP-A-2012-199236, JP-A-2013-23468, JP-A-2013-091244 and JP-A-2013-109059).

Namely, upon forming the liquid layer of a liquid immiscible with the contents, the above proposals all have succeeded in very improving the sliding property for the contents as compared to the prior arts and have made it possible to quickly discharge the contents out of the containers by tilting or inverting the containers without permitting the contents to adhere or stay on the inner walls of the containers.

The formed bodies of the structure forming the liquid layer on the surfaces thereof are not necessarily limited to those of the shapes of containers but can be applied to the formed bodies of the form of films, too. Upon suitably selecting the kind of the liquid, therefore, properties on the surfaces can be improved to a great extent.

Concerning the resin structures such as plastic containers having a liquid layer on the surfaces thereof, however, analysis has not still been forwarded to a sufficient degree. It has not been clarified to a sufficient degree, either, in what form the liquid layer should be formed and how the surface properties can be improved to a large extent maintaining stability. At present, therefore, attempts have been made extensively to attain improvements.

PRIOR ART DOCUMENTS

Patent Documents

Patent document 1: JP-A-2007-284066
Patent document 2: JP-A-2008-222291
Patent document 3: JP-A-2009-214914
Patent document 4: JP-A-2010-254377
Patent document 5: Japanese Patent No. 4878650

OUTLINE OF THE INVENTION

Problems that the Invention is to Solve

It is, therefore, an object of the present invention to provide a resin structure having a liquid layer formed on the surface of the resin formed body exhibiting improved properties on the surface of the resin formed body, e.g., exhibiting improved sliding property and non-adhesiveness to various substances maintaining stability as a result of forming the liquid layer.

Means for Solving the Problems

The present inventors have conducted experiments extensively concerning the resin structures forming a liquid layer on the surfaces of the resin formed bodies in regard to the sliding property for viscous substances. As a result, the inventors have discovered that if a liquid layer is so formed that the liquid level locally protrudes, more excellent sliding property is obtained than that of if the liquid layer is so formed as to have a flat liquid surface.

Namely, according to the present invention, there is provided a resin structure comprising a resin formed body and a liquid layer formed on a surface of the resin formed body, the liquid layer having portions that are locally protruded on the surface thereof.

In the resin structure of the present invention, it is desired that:
(1) Fine protrusions having heights of not less than 0.7 μm are distributed on the surface of the liquid layer at a density of 20 to 100 protrusions/mm$^2$;
(2) Fine protrusions having heights of not less than 0.7 μm are observed on the surface of the liquid layer maintaining a gap of 100 to 300 μm on the average;
(3) The liquid layer is present on the surface of the resin formed body in an amount of 0.5 to 30 g/m$^2$;
(4) The surface of the resin formed body supporting the liquid layer is formed of a resin layer in which fine particles having an average particle diameter of not more than 40 μm are dispersed;
(5) The fine particles are one or more kinds of particles selected from the group consisting of silica, polyethylene, polymethyl methacrylate and silicone particles;
(6) The fine particles are dispersed in an amount of 0.1 to 30 parts by weight per 100 parts by weight of the resin that forms the surface of the resin formed body;
(7) A liquid that forms the liquid layer is dispersed in the resin layer that forms the surface of the resin formed body, and the liquid layer is formed as the liquid oozes out;
(8) A liquid diffusion prevention layer is provided on a lower side of the resin layer that forms the surface of the resin formed body in order to suppress or block the diffusion of the liquid that forms the liquid layer;
(9) The resin structure is used as a packing material; and
(10) The packing material is a container, and the liquid layer is formed on an inner surface of the container.

In the invention, the surface of the liquid layer that is locally protruding means that the surface of the liquid layer (i.e., the liquid surface) is not flat but is forming protruded portions (liquid protrusions). The liquid protrusions do not mean that the surface of the underlying resin supporting the liquid layer is exposed. The liquid protrusions are not formed by the waves or shift of the liquid but remain stable at predetermined positions, and can be confirmed by using an atomic force microscope, a laser scanning microscope or a scanning white light interferometer.

Effects of the Invention

The resin structure of the invention has the liquid layer formed on the surface thereof. Due to the liquid layer, therefore, the multilayered structure exhibits various surface properties. Specifically, the liquid layer forms on the surface thereof locally protruded portions (liquid protrusions) and, therefore, helps greatly improve the surface properties.

For example, if the liquid layer is formed using a fluorine-containing liquid, a fluorine-containing surfactant, a silicone oil, or an oily liquid such as plant oil, then it is allowed to greatly improve the sliding property or non-adhesiveness to the aqueous substances such as water and the like. As demonstrated by experimental results in Examples and Comparative Examples appearing later, however, if liquid protrusions are formed, the sliding speed of the mayonnaise is increasing to be about twice as great as that of if no liquid protuberance is formed. Similarly, in the invention, if the liquid layer is formed by using an oil-repellent liquid, the sliding property and non-adhesiveness to the oily substances can be greatly improved.

In the invention, further, a liquid diffusion prevention layer is formed on the lower side of the resin layer on the surface of the resin formed body that is holding the liquid layer in order to suppress or prevent the diffusion of the liquid that forms the liquid layer. Therefore, the liquid layer can be held maintaining stability over long periods of time, and the effect for reforming the surface can be exhibited over extended periods of time.

Upon utilizing properties for improving the surface, therefore, the resin structure of the invention can be applied to a variety of applications by forming a liquid layer using a suitable liquid. Namely, the resin structure of the invention can be favorably used as packing containers for containing, specifically, viscous liquids (e.g., ketchup, mayonnaise, dressing, etc.).

BEST MODES FOR CARRYING OUT THE INVENTION

Figure 1:
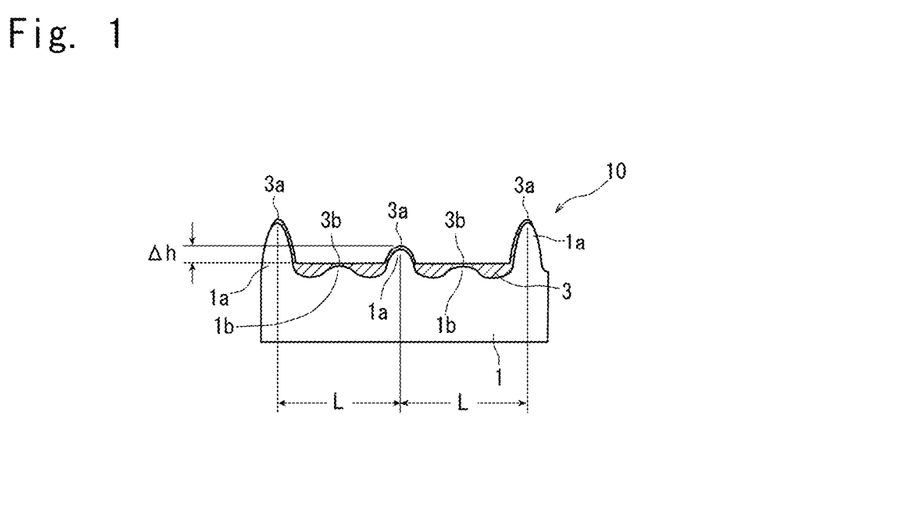
FIG. 1 is a view illustrating the state of the surface which is a major portion of the resin structure of the present invention.

<Surface State of the Resin Structure>
Referring to FIG. 1, the resin structure (generally designated at 10) of the invention comprises a resin formed body 1 and a liquid layer 3 covering the surface of the resin formed body 1. Here, what is particularly important is that liquid protrusions 3a are formed on the surface of the liquid layer 3 and flat surfaces 3b are formed among the liquid protrusions 3a. Namely, as will be understood from FIG. 1, relatively large protrusions 1a and relatively small protrusions 1b are being mixed together on the surface of the resin formed body 1. Roughly speaking, the liquid layer 3 has its surface formed along the surface of the resin formed body 1 on which the protrusions 1a and 1b are present being mixed together. Liquid protrusions 3a are formed being corresponded to the relatively large protrusions 1a, and the liquid layer is covering the relatively small protrusions 1b on the flat surfaces 3b.

If the liquid layer 3 is formed on the surface, the liquid plane becomes flat from the technical common sense. For instance, if the liquid layer 3 is formed on the surface on where the protrusions 1a and 1b are present being mixed together, the liquid layer 3 covers the whole protrusions 1a and 1b. Otherwise, the liquid layer 3 is so formed that the relatively high protrusions 1a are exposed but the relatively low protrusions 1b are covered. In either case, the surface (liquid plane) of the liquid layer 3, usually, becomes flat. In the present invention, however, the surface of the liquid layer 3 includes not only flat surfaces but also liquid protrusions 3a forming a very special surface.

Owing to the above special surface shape of the liquid layer 3, the present invention exhibits excellent sliding property.

Figure 2A:
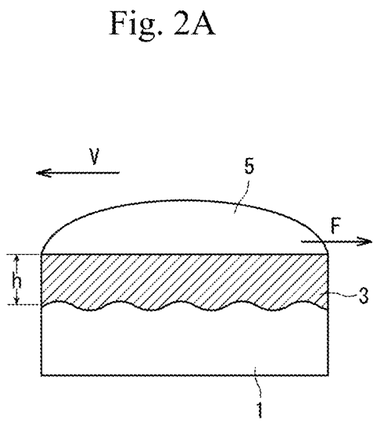
FIGS. 2A and 2B are views illustrating the principle of the present invention.
Figure 2B:
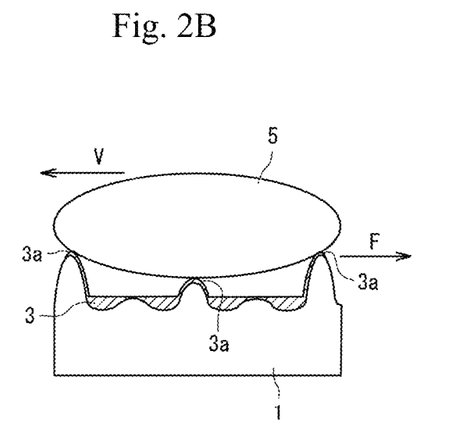

Referring to FIGS. 2A and 2B that illustrate the principle of the present invention, if it was attempted to improve the surface properties such as sliding property on the surface of the resin formed body 1 for a fluid 5 by using the liquid layer 3, it was a practice as shown in FIG. 2A that the fluid 5 came in contact over its whole surface with the surface of the liquid layer 3. Depending on the material of the fluid 5, therefore, it was attempted to select the kind of the liquid that formed the liquid layer 3 in an effort to greatly improve the surface properties. Namely, it was attempted to improve surface properties for the fluid 5 relying upon the properties of the liquid that is forming the liquid layer 3 for the fluid 5.

According to the present invention as shown in FIG. 2B, however, the fluid 5 slides on the resin formed body 1 coming in contact with the liquid layer 3 but not coming in contact over its whole surface; i.e., the fluid 5 slides partly coming in contact with the liquid layer 3 at portions where the liquid protrusions 3a are formed. Namely, in the invention, the sliding property for the fluid 5 is greatly improved as compared to the case where the fluid 5 slides coming over its whole surface into contact with the liquid layer 3 as shown in FIG. 2(a).

The reason has not been completely clarified yet why the sliding property is further improved if the fluid slides partly in contact with the liquid layer 3. The present inventors, however, estimate the reasons as described below.

That is, if the fluid 5 slides along the surface of the liquid layer 3, the flow of the fluid 5 corresponds to the Couette flow in which the velocity of flow acquires a linear distribution. Therefore, the frictional force F which the fluid 5 receives from the liquid layer 3 is given by the following formula;

$$F = \eta V A / h$$

wherein, $\eta$ is a viscosity of the liquid forming the liquid layer 3,
V is a velocity V of flow of the fluid 5,
A is an area of contact between the fluid 5 and the liquid layer 3, and
h is a thickness of the liquid layer 3.

If the flow of the fluid 5 in the case of FIG. 2A is compared with the flow thereof in the case of FIG. 2B in regard to the frictional force F, the flow in the case of FIG. 2B has a very small area of contact ($\eta$ is dependent on the kind of the liquid and is, therefore, the same for the two cases). It is, therefore, learned that the frictional force F is considerably small in the case of the flow of FIG. 2B. That is, upon forming the liquid protrusions 3a on the surface of the liquid layer 3, the fluid 5 slides involving a very small frictional force F. As a result, it is estimated that the sliding speed very increases and the sliding property is greatly improved. In effect, in the case of FIG. 2A, the sliding property improves depending only upon the chemical properties of the liquid forming the liquid layer 3. The present invention, on the other hand, utilizes not only the chemical properties of the liquid but also the physical action, i.e., a decreased frictional force accomplished by a decreased area of contact attaining, therefore, a further improved sliding property.

Here, in considering the effect for improving the sliding property of the invention, it is also probable that the sliding property is further improved as the air is entrapped by the gaps between the fluid 5 and the liquid layer 3. However, the liquid protrusions 3a formed on the surface of the liquid layer 3 are very fine and have small heights (difference of elevation $\Delta h$ is small from the flat surfaces 3b). Therefore, it is not considered that there are formed gaps large enough to entrap the air between the fluid 5 and the liquid layer 3. As described above, therefore, it is proper to consider that the sliding property is improved due to a decrease in the frictional force F.

The surface structure in the resin structure of the invention described above can be analyzed by using an atomic force microscope, a laser scanning microscope or a scanning white light interferometer as will be described later in Examples. Further, presence of the liquid layer 3 can be easily confirmed by measuring the water contact angle (WCA).

According to the analysis of the surface structure, it is desired that, in the invention, the liquid protrusions 3a (fine protrusions) of heights $\Delta h$ of not less than 0.7 μm are distributed on the surface of the liquid layer 3 at a density of 20 to 100 protrusions/mm$^2$ and, more desirably, are observed maintaining a distance (L) of 100 to 300 μm on average. The heights $\Delta h$ of the liquid protrusions 3a stand for differences of elevation between the protrusions 3a and the flat surfaces 3b.

If the distance (L) among the liquid protrusions 3a of the above heights is narrower than the above range (liquid protrusions 3a are densely formed), the fluid 5 slides down coming in contact with the liquid layer 3 over an increased area. In this case, therefore, the frictional force F cannot be decreased and the effect for improving the sliding property tends to decrease. Even if the distance L among the liquid protrusions 3a become larger than the above range (liquid protrusions 3a are sparsely formed), too, the fluid 5 slides down coming in contact with the liquid layer 3 over an increased area. This is because the distance is so large among the liquid protrusions 3a that the fluid 5 comes in contact with the liquid layer 3 on the flat surfaces 3b, too. Specifically, if the fluid 5 is a viscous fluid, the shape varies and the area of contact increases conspicuously. In this case, too, therefore, the frictional force F cannot be decreased and the effect for improving the sliding property becomes small.

Even if the liquid protrusions 3a are so formed as to satisfy the distance L, the fluid 5 slides down also coming in contact with the liquid layer 3 over an increased area if the heights Δh of the liquid protrusions 3a are smaller than the above range.
Therefore, the frictional force F cannot be decreased and the effect for improving the sliding property becomes small.

There is a limit in the difference Δh of elevation of the liquid protrusions 3a, and the upper limit is, usually, about 50 to about 100 μm. That is, protrusions 1a of large heights can be formed on the surface of the resin formed body 1 supporting the liquid layer 3. However, if the liquid layer 3 is formed on the protrusions 1a of such large heights, then the liquid must be used in an increased amount for forming the liquid layer 3. As a result, the liquid layer 3 assumes a flat surface 3b over nearly the whole surface thereof, and a large difference of elevation Δh cannot be realized.

In the invention described above, the liquid layer 3 is a considerably thin layer. For forming the liquid layer 3, the liquid is used in an amount of, for example, in a range of 0.5 to 30 g/m$^2$, preferably, 0.5 to 20 g/m$^2$, and specifically, 0.5 to 10 g/m$^2$. If the amount of the liquid is too small, the liquid layer 3 becomes a discrete layer and the liquid fails to exhibit its chemical properties (e.g., water-repelling property, oil-repelling property, etc.) to a sufficient degree for the fluid 5, and it becomes difficult to obtain the effect for improving the sliding property to a large extent. Further, if the amount of the liquid is too large, the height Δh of the liquid protrusions 3a becomes small. As a result, the area of contact cannot be decreased and the frictional force F cannot be fully decreased making it difficult to obtain the effect for improving the sliding property to a large extent.

In the present invention, to stably and evenly impart the surface properties by using the liquid, the liquid layer 3 must be formed so as to maintain a covering ratio F of not less than 0.5 and, preferably, not less than 0.6 as calculated according to the following formula (1), $$F=(\cos\theta-\cos\theta_B)/(\cos\theta_A-\cos\theta_B)$$

wherein θ is a water contact angle on a surface of the resin structure 10,
$\theta_A$ is a water contact angle on the liquid that is forming the liquid layer 3, and
$\theta_B$ is a water contact angle on a simple plastic material that is forming the resin formed body 1.

If the water contact angle θ on the surface of the resin structure 10 is the same as the water contact angle $\theta_A$ on the liquid layer 3, it means that the covering ratio F is 1.0 and the resin formed body 1 as a whole has been covered with the liquid layer 3.

For example, if the covering ratio F is smaller than the above range, the liquid layer 3 is formed in a manner that the liquid is dotted on the surface despite the liquid is present in large amounts, and the surface properties cannot be exhibited to a sufficient degree.

Here, the above formula (1) is obtained by modifying the Cassie-Baxter's formula that expresses the apparent contact angle θ on a composite surface formed of two kinds of components (A, B). This is expressed by the formula, $$\cos\theta = F_A\cos\theta_A + F_B\cos\theta_B$$
$$= F_A\cos\theta_A + (1-F_A)\cos\theta_B$$

wherein,
$F_A$ is a ratio of the component A,
$F_B$ is a ratio of the component B (but $F_A+F_B=1$),
$\theta_A$ is a liquid contact angle on the simple component A, and
$\theta_B$ is a liquid contact angle on the simple component B.

In the present invention, the above-mentioned liquid protrusions 3a are formed on the surface of the liquid layer 3. In this connection, relatively large protrusions 1a and relatively small protrusions 1b are formed in a mixed manner on the surface of the resin formed body 1 (hereinafter often called underlying surface) supporting the liquid layer 3. As described earlier, the liquid protrusions 3a are formed being corresponded to the relatively large protrusions 1a, and flat surfaces 3b of the liquid layer 3 are formed on the relatively small protrusions 1b. Such protrusions 1a and 1b, too, can be analyzed by using the atomic force microscope, laser scanning microscope or scanning white light interferometer.

For example, in a three-dimensional surface shape profile of the resin formed body 1 obtained by scanning the surface thereof over a range of 1.4 mm×1.05 mm by using the scanning white light interferometer, it is desired that the density of protrusions of heights of not lower than 0.7 μm are in a range of 20 to 100 protrusions/mm$^2$ and the distances (L) among the protrusions are in a range of 100 to 300 μm on average. It is, further, desired that a maximum height of the protrusions is in a range of 1.5 to 40 μm and, specifically, 2.5 to 30 μm from the standpoint of stably maintaining the liquid layer 5 on the whole underlying surface and for forming the liquid protrusions 3a that satisfy the above-mentioned conditions. That is, if the density of protrusions is smaller than the above range and the maximum height of protrusions is smaller than the above range, then the length L increases among the protrusions, large protrusions 1a corresponding to the liquid protrusions 3a are not formed, it becomes difficult to form the above-mentioned liquid protrusions 3a, the area of contact with the flat surfaces 3b increases, and the effect of the present invention is not exhibited. Further, if the density of protrusions is larger than the above range, the distances L among the protrusions decrease and spaces among the protrusions tend to be filled with the liquid though dependent upon the amount of the liquid layer that is covering. Namely, the liquid protrusions 3a are not formed, the area of contact with the flat surfaces 3b increases, and the effect of the present invention may not be exhibited.

<Forming the Surface Structure>

In the invention, the surface structure of the resin structure 10 is realized by blending the resin for forming the resin formed body 1 (underlying surface) with an additive for roughening the surface and with the liquid for forming the liquid layer 3, and by forming the surface of the resin formed by 1 (underlying surface) by using the above resin composition.

There is no limitation on the resin for forming the resin formed body 1 (underlying surface) so far as it is capable of forming a shape that meets the use of the resin structure 10, and there can be used any resin. Specifically, however, from the standpoint of forming the liquid layer 3 by causing the liquid to ooze out, it is desired to use a thermoplastic resin having a relatively low density (e.g., not more than about 1.7 g/cm$^3$) and, specifically, an olefin resin such as low-density polyethylene, linear low-density polyethylene, medium- or high-density polyethylene, polypropylene, poly 1-butene, or poly 4-methyl-1-pentene; or a polyester resin such as a copolymerized resin of the above olefins, polyethylene terephthalate, polyethylene naphthalate, or polyethylene terephthalate/isophthalate. In particular, if the resin structure 10 is used as a squeeze container for squeezing out the content, it is desired to use an olefin resin as represented by a low-density polyethylene or a linear low-density polyethylene.

The additive for roughening the surface added to the resin is for so roughening the underlying surface that the density of protrusions (number of protrusions/mm$^2$) and the maximum height of protrusions lie within predetermined ranges. Usually, there are used fine particles having an average particle diameter of not more than 40 µm and, specifically, 0.2 to 20 µm. For instance, of the fine particles lying in the above ranges, inorganic fine particles such as of silica or the like are very fine particles having, as a particulate constituent unit, a primary particle diameter of 0.003 to 0.2 µm. Therefore, a strong attraction works among the primary particles; i.e., they cannot individually exist in the form of primary particles but usually exist in the form of secondary particles being aggregated together and having a large specific surface area and a large porous volume. Therefore, by forming the underlying surface by adding such fine particles to the resin, the fine particles become continuous to one another to form protrusions 1a, 1b. Besides, the protrusions formed by the fine particles work to easily hold the liquid. Therefore, the liquid layer 3 is formed on, for example, tall protrusions 1a, too, and liquid protrusions 3a are easily formed on the surfaces of the liquid layer 3.

Here, the average particle diameter of fine particles may vary depending on the kinds and sizes of fine particles but can, usually, be measured by the method of observation using an electron microscope such as transmission type electron microscope or scanning type electron microscope or by the laser diffraction-scattering method by using a laser diffraction type grain size distribution-measuring apparatus. When measured by using the electron microscope, the average particle diameter of fine particles is defined to be an average diameter of particles that are measured. When measured by the laser diffraction-scattering method, the average particle diameter of fine particles is defined as a particle diameter at an integrated value of 50% calculated as a volume in the particle size distribution that is obtained. In the case of fine particles having a primary particle diameter of not more than 0.2 µm such as of silica, it is very difficult to let the fine particles present in the form of primary particles. Therefore, the particle diameters of the secondary particles are defined as an average particle diameter.

There is no specific limitation on the fine particles so far as the average particle diameter lies in the above range. Usually, however, there are used metal oxide particles such as of titanium oxide, alumina or silica; carbonates such as calcium carbonate and the like; carbon type fine particles such as of carbon black; or organic fine particles such as polymethyl (meth)acrylate, polyethylene, polyorganosilsesquioxane represented by silicone particle. They may have been treated to be hydrophobic with a silane coupling agent or a silicone oil. The present invention can be put into practice by the extrusion forming such as direct-blow forming, too. Therefore, the particle diameter may be maintained after the melt-forming. Accordingly, there are preferably used fine particles that have been treated to be hydrophobic and, specifically, hydrophobic silica, cured polymethyl methacrylate, ultra-high-molecular-weight polyethylene, polyorganosilsesquioxane and silicone particles.

The fine particles are used as an additive for roughening the surface in an amount of, usually, 0.1 to 30 parts by weight, preferably, 0.3 to 20 parts by weight and, more preferably, 0.3 to 10 parts by weight per 100 parts by weight of the resin. Use in amounts outside the above range makes it difficult to form a roughened surface that enables the liquid protrusions 3a to be favorably formed.

As for the liquid for forming the liquid layer 3, there is used a liquid of a suitable kind depending on the surface properties that are to be imparted to the surface of the resin structure (resin formed body 1). Here, however, the liquid must be a nonvolatile liquid having a small vapor pressure under the atmospheric pressure, e.g., a high-boiling liquid having a boiling point of, for example, not lower than 200° C. If a volatile liquid is used, it easily volatilizes and extinguishes with the lapse of time making it difficult to form the liquid layer 3.

There can be concretely exemplified a variety of liquids provided they are high-boiling liquids and specifically those liquids having surface tensions that are greatly different from the surface tensions of the matters that are to slide since they provide a high lubricating effect. To improve sliding property for water and hydrophilic substances containing water, it is desired to use a liquid having a surface tension in a range of 10 to 40 mN/m and, specifically, 16 to 35 mN/m as represented by a fluorine-contained liquid, fluorine-contained surfactant, silicone oil, fatty acid triglyceride and various plant oils. As the plant oils, there can be favorably used soybean oil, rape oil, olive oil, rice oil, corn oil, safflower oil, sesame oil, palm oil, castor oil, avocado oil, coconut oil, almond oil, walnut oil, hazel oil and salad oil.

The liquid is, usually, used in an amount of 0.3 to 20 parts by weight and, specifically, 1 to 10 parts by weight per 100 parts by weight of the above-mentioned resin. If the amount thereof is too small, it becomes difficult to form the liquid layer 3 itself. If the amount thereof is too large, on the other hand, the liquid layer 3 can be formed but it becomes difficult to form the liquid protrusions 3a of a predetermined height Δ h on the surface of the liquid layer 3.

The resin structure 10 of the invention is produced by using a resin composition prepared by mixing together the above-mentioned resin, the additive for roughening the surface and the liquid for forming the liquid layer, and by forming the resin composition into a predetermined shape by a known means such as extrusion forming, direct blow forming or the like means. The resin structure can also be produced by such means as preparing a coating solution by dissolving or dispersing the above resin composition in a suitable low-boiling organic solvent (e.g., hydrocarbon type solvent or alcohol type solvent), applying the coating solution onto a formed body that has been formed in a predetermined shape in advance, and drying the coating solution.

The liquid oozes out on the underlying surface of the resin formed body 1 of which the surface has been roughened to a suitable degree, and there is formed the liquid layer 3 having the liquid protrusions 3a on the surface thereof.

Means can be contrived to roughen the surface of the resin formed body 1 to a suitable degree by machining work such as laser beam machining or sand blasting. However, a considerably fine surface roughness is required for forming the liquid protrusions 3a. The surface formed by the machining work is not suited for forming the liquid protrusions, and it is recommended to use the resin composition that contains the above-mentioned fine particles as the additive for roughening the surface.

Means can also be contrived to form the liquid layer 3 by externally adding a liquid for forming the liquid layer 3 by such a method as spraying or dipping. However, the liquid layer 3 having the liquid protrusions 3a is considerably thin, and means for externally adding the liquid is not suited for the invention. It is, therefore, recommended to use the resin composition containing the liquid for forming the liquid layer 3.

<Multilayered Structure>

The resin structure 10 of the invention having the above-mentioned surface structure can be used alone. Desirably, however, it is used in the form of a multilayered structure on which the layers of other materials are laminated yet leaving the surface structure. For instance, a multilayered structure can be favorably employed being provided with a liquid diffusion prevention layer on the lower side of the resin formed body that is forming the underlying surface that supports the liquid layer 3.

Figure 3:
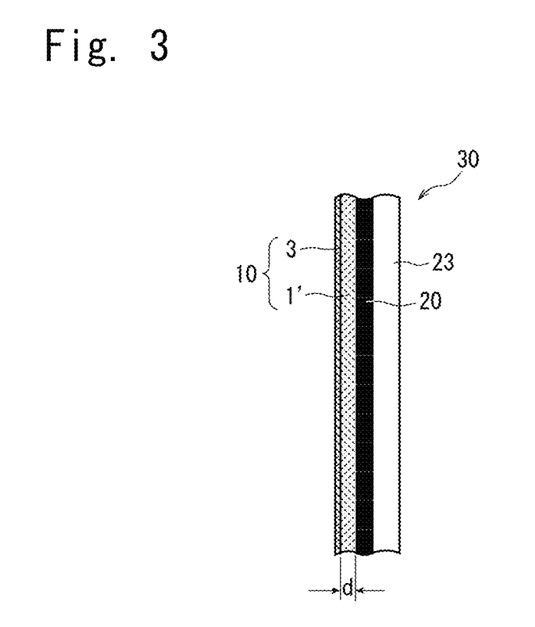
FIG. 3 is a view illustrating a layer constitution of a multilayered structure equipped with the resin structure of the present invention.

In an example of FIG. 3, for instance, a structure generally designated at 30 has an underlying resin layer 1' having on the surface thereof a liquid layer 3 that has the above-mentioned liquid protrusions 3*a* (not shown in FIG. 3), the underlying resin layer 1' being laminated on a liquid diffusion prevention layer 20 which is provided on a base member 23 made of a suitable material.

Namely, the underlying resin layer 1' corresponds to the above-mentioned resin formed body 1, and a combination of the underlying resin layer 1' and the liquid layer 3 corresponds to the resin structure 10 shown in FIG. 1.

In the layer structure of FIG. 3, the liquid diffusion prevention layer 20 works to shut off the permeation or diffusion of the liquid that forms the liquid layer 3. Due to the formation of this layer, the surface properties imparted by the liquid layer 3 can be maintained with stability for extended periods of time.

That is, despite the liquid of a predetermined amount is contained in the underlying resin layer 1', it oozes out to form the liquid layer 3 and, further, gradually migrates toward the surface on the side opposite to the underlying resin layer 1'. Therefore, the amount of the liquid forming the liquid layer 3 gradually decreases with the passage of time and, as a result, the surface properties imparted to the liquid layer 3 are likely to be lost with the passage of time. In the embodiment of FIG. 3, however, presence of the liquid diffusion prevention layer 20 prevents the liquid of the liquid layer 3 (or the underlying resin layer 1') from permeating or diffusing. Therefore, the amount of liquid in the liquid layer 3 is effectively suppressed from decreasing, and the surface properties are prevented from being lost with the passage of time.

There is no specific limitation on the material of the liquid diffusion prevention layer 20 provided it is capable of preventing the liquid from permeating or diffusing. The liquid diffusion prevention layer 20 may be formed by using a metal foil, a metal-deposited film or an inorganic material such as glass or ceramics, or may be formed by using a film on which diamond-like carbon (DLC) is deposited or an organic film such as of thermosetting resin or thermoplastic resin. If the liquid diffusion prevention layer is formed by using an inorganic material, however, limitation is imposed on the forming means, and the multilayered structure 30 or the underlying resin layer 1' is limited to the form of a film. Usually, therefore, it is desired that the liquid diffusion prevention layer is formed by using an organic material and, specifically, a thermoplastic resin. The thermoplastic resin can be excellently formed without imposing any limitation on the form of the multilayered structure 30 and enabling the multilayered structure 30 to assume the form of, for example, a blow-formed container or the like.

As the thermoplastic resin for forming the liquid diffusion prevention layer 20, there is used the one having a density of not lower than 1.00 g/cm$^3$ and a glass transition point (Tg) of not lower than 35° C. or the one having a crystallinity of not less than 0.5. Namely, the thermoplastic resins of these kinds are dense and are considered to very limit the migration or diffusion of the liquid in the resin and effectively suppress the permeation or diffusion of the liquid. For example, with the resin having a density and a glass transition temperature (Tg) lower than the above ranges, the liquid diffusion prevention layer becomes a loose layer which is capable of limiting the migration or diffusion of the liquid very little and makes it difficult to effectively prevent the liquid from permeating or diffusing. Further, the resin having a crystallinity of less than 0.5 contains less crystal components that limit the migration or diffusion of the liquid in the resin, exhibits less restraint, and makes it difficult to effectively prevent the liquid from permeating or diffusing.

If compared to the inorganic materials such as gold foil, metal-deposited film or glass, the thermoplastic resin has poor capability for preventing the diffusion of liquid. It is, therefore, necessary to form the liquid diffusion prevention layer 20 in a relatively large thickness, for example, in a thickness of not less than 2 μm and, specifically, about 5 to about 80 μm. Namely, if the thickness is too small, the capability for preventing the diffusion of liquid may become unsatisfactory. Even if the thickness is too large, on the other hand, the multilayered structure 30 becomes unnecessarily thick offering no advantage even from the standpoint of cost. The thickness of the liquid diffusion prevention layer 20 can be adjusted depending on the duration of period in which the required surface properties are to be maintained.

In the invention, there is no specific limitation on the thermoplastic resin having the above density and glass transition temperature (Tg). Usually, however, there is used a gas barrier resin such as ethylene•vinyl alcohol copolymer (saponified product of an ethylene•vinyl acetate copolymer), aromatic polyamide or cyclic polyolefin; polyester such as polyethylene terephthalate or liquid crystal polymer; or polycarbonate. For example, the liquid diffusion prevention layer 20 formed by using the above gas barrier resin is also imparted with gas blocking property preventing the permeation of gas such as oxygen or the like. Specifically, if the structure 20 is used in the form of a container, it is allowed to prevent the content from being oxidized and deteriorated offering great advantage. Of them, the ethylene-vinyl alcohol copolymer exhibits particularly excellent oxygen barrier property, and is most desired.

As the ethylene•vinyl alcohol copolymer, there can be desirably used copolymerized and saponified products that are obtained by so saponifying an ethylene vinyl acetate copolymer having an ethylene content of 20 to 60 mol % and, specifically, 25 to 50 mol % that the degrees of saponification thereof are not less than 96 mol % and, specifically, not less than 99 mol %. From them are selected those having the densities and the glass transition temperature (Tg) that lie in the above-mentioned ranges.

The above gas barrier resins can be used alone. Further, so far as the densities and the glass transition temperature (Tg) are lying in the above ranges, the gas barrier resin can be blended with a polyolefin such as polyethylene to form the liquid diffusion prevention layer 20.

Here, if the above gas barrier resin is used as the liquid diffusion prevention layer 20, it is desired that an adhesive resin layer (not shown) is provided neighboring the liquid diffusion prevention layer 20 to increase adhesion to the underlying resin layer 1' (or the base member 23) and to prevent delamination. The liquid diffusion prevention layer 20 can thus be firmly adhered and secured to the underlying resin layer 1 or the base member 23. The adhesive resin for forming adhesive layer has been known per se. For example, there can be used, as the adhesive resin, a resin that contains the carbonyl group (>C=O) in the main chain or the side chain thereof in an amount of 1 to 100 meq/100 g of the resin and, specifically, 10 to 100 meq/100 g of the resin. Concretely, there can be used an olefin resin graft-modified with a carboxylic acid such as maleic acid, itaconic acid or fumaric acid or an anhydride thereof, or graft-modified with amide or ester; an ethylene-acrylic acid copolymer; an ionically crosslinked olefin copolymer; or an ethylene-vinyl acetate copolymer. The adhesive resin layer has a thickness for attaining a suitable degree of adhering force, which is usually, about 0.5 to about 20 μm and, preferably, about 1 to about 8 μm.

Further, if the above gas barrier resin is used in the form of a film as the liquid diffusion prevention layer 20, there can be used any adhesive resin without any limitation, such as those that have been used for dry lamination, anchor coating and primers. Their known examples may be urethane resin, phenol resin, epoxy resin, alkyd resin, melamine resin, acrylic resin, polyester resin, amino resin, fluorine-contained resin, cellulose resin and isocyanate resin. These adhesive resins may be used alone or, as required, being mixed together. Further, they can be used in either an aqueous system or a solvent system so far as they are capable of maintaining close adhesion and wettability to the base member. In addition to the above components, further, it is allowable to use curing acceleration catalyst, filler, softening agent, anti-aging agent, silane coupling agent, stabilizer, adhesion accelerator, leveling agent, defoaming agent, plasticizer, inorganic filler and tackiness-imparting resin that have been known per se. so far as they do not impair the properties of the adhesive agent. There is no specific limitation on the amount of the adhesive agent that is applied provided the amount is in a range in which it does not impair the applicability or economical advantage. The amount is, preferably, in a range of 0.01 to 10 μm and, more preferably, 0.1 to 5.0 μm. The adhesive agent may be applied by, for example, spraying, dipping or by using a spin coater, a bar coater, a roll coater or a gravure coater.

Usually, the adhesive resin, too, has a density, a glass transition point and a crystallinity within ranges as described above and, therefore, is capable of serving as the liquid diffusion prevention layer 20. That is, if the above-mentioned liquid diffusion prevention layer 20 is formed by using the gas barrier resin, the sum of the thickness of the gas barrier resin layer and the thickness of the adhesive resin layer is set to lie in the above-mentioned range of thickness (not less than 2 μm and, specifically, about 5 to about 80 μm) so that it works as the liquid diffusion prevention layer 20 to a sufficient degree.

In the invention, further, it is desired that the liquid diffusion prevention layer 20 is so formed that a distance d thereof from the surface of the underlying resin layer 1' (from the interface between the underlying resin layer 1' and the liquid layer 3) is not more than 200 μm and, preferably, not more than 150 μm. If the distanced is too large, infiltration or diffusion of the liquid can be still prevented by the liquid diffusion prevention layer 20. However, the liquid is made present in too large amounts between the liquid diffusion prevention layer 20 and the surface of the underlying resin layer 1'. As a result, it may become difficult to form the liquid layer 3 or to effectively suppress the liquid layer 3 from extinguishing with the lapse of time.

As will be understood from the above description, further, the underlying resin layer 1' is formed that the distance d is not more than a predetermined value between the surface thereof (interface relative to the liquid layer 3) and the liquid diffusion prevention layer 20. To express a suitable degree of anchoring effect to the liquid layer 3, however, it is desired that the distance d is at least not less than 5 μm and, specifically, not less than 10 μm.

In the multilayered structure of FIG. 3, further the base member 23 formed on the other side of the liquid diffusion prevention layer 20 is not particularly necessary but is suitably provided depending on the form of use of the multilayered structure 30.

The material of the base member 23 is selected depending on the use of the multilayered structure 30. Generally, however, the base member 23 is formed by using various plastic materials or papers, and may comprise a multiplicity of layers. For instance, the base member 23 can be formed in a multilayered structure inclusive of a resin layer that has the same function as that of the above-mentioned liquid diffusion prevention layer 20. Moreover, a reproduced resin layer containing the scrap resin such as of burrs generated at the time of forming the structure 30, can be formed in the base member 23.

That is, if the multilayered structure 30 is to be used as a squeeze container for squeezing out the content, the base member 23 is formed by using a low-density polyethylene, a linear low-density polyethylene or polypropylene from the standpoint of squeezing. In this case, a suitable adhesive resin layer can be provided between the base member 23 and the liquid diffusion prevention layer 20. Or as described above, another gas barrier resin layer (that also works as a liquid diffusion prevention layer) and a reproduced resin layer can be formed as layers on the inside of the base member 23 (as layers on the side opposite to the liquid layer 3).

Figure 4:
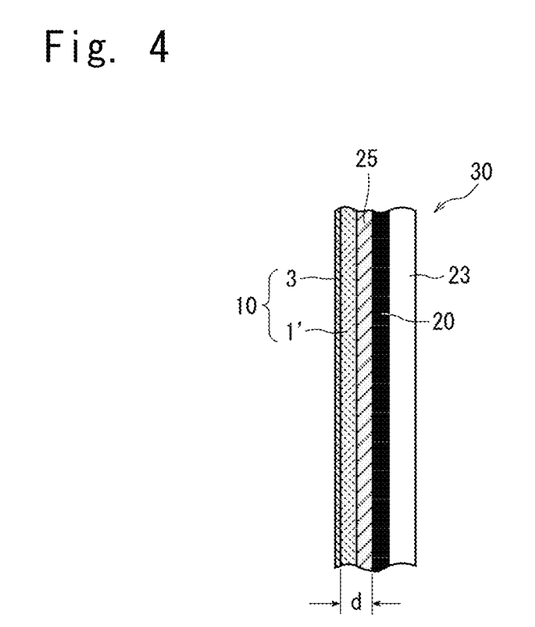
FIG. 4 is a view illustrating a layer constitution of a multilayered structure equipped with the resin structure of the present invention.

The layer constitution of the above structure 20 is not limited to the one that is shown in FIG. 3 but may be, for example, the one shown in FIG. 4 in which a liquid diffusion adjustment layer 25 is provided between the underlying resin layer 1' and the liquid diffusion prevention layer 20.

As described already, the underlying resin layer 1' is blended with the liquid that forms the liquid layer 3; i.e., the liquid layer 3 is formed as the liquid oozes out from the underlying resin layer 1'. In the embodiment of FIG. 4, however, the liquid permeates and diffuses into the liquid diffusion adjustment layer 25, too. This is advantageous for adjusting the liquid to ooze out in a suitable amount on the surface of the underlying resin layer 1', for preventing the liquid from oozing out in excess amounts and, therefore, for forming the liquid layer 3 having liquid protrusions 3a formed on the liquid surface thereof based on proper amount of the liquid.

Basically, any resin can be used for forming the liquid diffusion adjustment layer 25 if it permits the liquid that forms the liquid layer 3 to permeate and diffuse therein. Usually, however, the liquid diffusion adjustment layer 25 is formed by using the same resin as the resin that forms the underlying resin layer 1'.

If the liquid diffusion adjustment layer 25 is provided, too, it is desired that the distance d between the liquid diffusion prevention layer 20 and the surface of the underlying resin layer 1' lies in the above-mentioned range. Under the condition that the distance d is maintained to lie in the above range, it is desired that the thickness ratio $t_1/t_2$ of the thickness $t_1$ of the liquid diffusion adjustment layer 15 and the thickness $t_2$ of the underlying resin layer 3 is set to lie in a range of 0.1 to 10 to exhibit the function of the liquid diffusion adjustment layer 15 to a sufficient degree.

The above-mentioned underlying resin layer 1', liquid diffusion prevention layer 20, liquid diffusion adjustment layer 25 and base member 23 may be suitably blended with additives such as antioxidant, surfactant, coloring agent and the like depending on the kinds of the materials forming the layers and in amounts that will not impair properties of the layers.

In the multilayered structure 30 having the above layer constitution, the kind of the liquid forming the liquid layer 3 may differ depending on the form and use thereof. In order for the liquid layer 3 to exhibit its surface properties to a sufficient degree, however, the liquid protrusions 3a are formed on the liquid surface of the liquid layer 3, and a covering ratio F with the liquid layer 3 represented by the above formula (1) is maintained to be not less than 0.5, specifically, not less than 0.6 and, most effectively, not less than 0.8.

<Use of the Resin Structure 10 and the Multilayered Structure 30>

The resin structure 10 of the present invention and the multilayered structure 30 on which the resin structure 10 is laminated, can assume various forms. Depending on the forms, the liquid for forming the liquid layer 3 is selected to exhibit desired surface properties.

For instance, the resin structure 10 or the multilayered structure 30 can be used in the form of a film being stuck to a predetermined place.

In such a case, a removable film such as silicon paper or polyester film is provided on the surface of the underlying resin layer 1' of the multilayered structure 30 and on the back surface of the liquid diffusion prevention layer 20 (or the base member 23) via a suitable adhesive agent. Prior to the use, the removable film is removed and the multilayered structure 30 is stuck to the predetermined surface such that the surface of the underlying resin layer 1' is exposed. If the multilayered structure 30 of this invention is used in such a form, the surface properties of the liquid layer 3 can be expressed at a desired place. For example, if a fluorine-contained surfactant is used as the liquid for forming the liquid layer 3 and if the multilayered structure 30 is stuck to a mirror in a bathroom, no water droplet adheres to the surface of the mirror; i.e., water droplets quickly flow down and the multilayered structure 30 exhibits its function as a mirror anti-fogger.

The mode of use quite holds true for the resin structure 10 of the single-layer structure of FIG. 1, too.

The removable film, if it is provided on the surface of the underlying resin layer 1' (resin formed body 1 in FIG. 1), is removed, and the liquid contained in the underlying resin layer 1' (or the resin formed body 1) oozes out on the surface to form the liquid layer 3.

The multilayered structure 30 in the form of a film can be formed by forming the underlying resin layer 1', liquid diffusion prevention layer 20, liquid diffusion adjustment layer 15 and a film that serves as the base member 23 relying on an ordinary method such as casting method, T-die method, calender method or inflation method, and press-adhering them together with the application of heat, or by simultaneously extruding the resins for forming these layers.

Further, by sticking two pieces of the film-like multilayered structure 30 together, there can be obtained a bag-like container.

Basically the same holds for the resin formed body of the single-layer structure of FIG. 1, too.

In the present invention, further, it is desired to use the multilayered structure 30 (or the resin structure 10) in the form of a container from the standpoint of utilizing the surface properties of the liquid layer 3 to a sufficient degree. Namely, by forming the liquid layer 3 on the inner surface of the container (on the surface that comes in contact with the content) by using a liquid immiscible with the content contained in the container, it is made possible to prevent the content from adhering on the container wall and to quickly discharge the content in short periods of time depending on the form of the container.

No specific limitation is imposed on the form of the container which may be in the form of cup, bottle, bag (pouch), syringe, pot, tray or any form depending on the material of the container, and may also have been stretch-formed.

The above packing containers are capable of exhibiting the surface properties of the liquid layer 3 to a sufficient degree and are, therefore, most desired for containing, specifically, ketchup, aqueous paste, honey, sauces, mayonnaise, mustard, dressing, jam, chocolate syrup, cosmetic liquids such as milky lotion and the like, as well as viscous contents such as liquid detergent, shampoo, rinse and the like. That is, with the liquid layer 3 being formed by using a suitable liquid depending on the kind of the content, the container may be tilted or inverted to quickly discharge the content without permitting it to adhere on the container inner wall.

For instance, the ketchup, sauces, honey, mayonnaise, mustard, jam, chocolate syrup, milky lotion and the like are hydrophilic substances containing water. As the liquid for forming the liquid layer 5, therefore, there are preferably used oily liquids such as silicone oil, glycerol esters of fatty acid and edible oil that have been approved as food additives.

EXAMPLES

The invention will now be described by way of Examples.

Described below are a variety of properties, methods of measuring the properties and resins used for forming the resin structures (containers) in Examples described below.

1. Measuring the covering ratio of the liquid layer.

Test pieces each measuring 10 mm×60 mm were cut out from the body portions of the multilayered containers which are the resin structures having a capacity of 500 g formed by the methods described later. By using a solid-liquid interface analysis system, DropMaster 700 (manufactured by Kyowa Kaimen Kagaku Co.) under a condition of 23° C. 50% RH, the test pieces were so fixed that the inner layers thereof were facing upward. Pure water of 3 μL was placed on each test piece and was measured for its water contact angle θ. By using the obtained water contact angles, the covering ratio F of the liquid layer on the surface of the resin structure was found according to the following formula (1), $$F=(\cos\theta-\cos\theta_B)/(\cos\theta_A-\cos\theta_B) \quad (1)$$

wherein θ is a water contact angle on the surface of the resin structure, $\theta_A$ is a water contact angle on the liquid forming the liquid layer, and $\theta_B$ is a water contact angle on the simple plastic material forming the resin formed body.

In finding the covering ratio F of the liquid layer, the following water contact angles were used as the values of $\theta_A$ and $\theta_B$.

$\theta_B$: 100.1°

(value on a simple resin formed body of a high-pressure low-density polyethylene (MFR=0.3))

$\theta_A$: 80.3°

(value on a medium-chain fatty acid triglyceride (liquid))

2. Measuring the amount of the liquid layer that is covering.

By using the multilayered containers having a capacity of 500 g formed by the methods described later, the liquid layers formed on the inner surfaces of the containers were recovered with 30 mL of a solvent (heptane) miscible with the liquid layer, concentrated by using an evaporator and, thereafter, the residues were transferred onto an evaporating dish to find the weight of the liquid layer component. The weight that was found was divided by the area of the inner surface of the container and was regarded to be the amount of the liquid layer (g/m$^2$) covering the inner surface of the bottle. The smaller the value, the smaller the thickness of the liquid layer formed on the inner surface of the container.

3. Measuring the slide-down speed of the fluid contents.

Test pieces measuring 20 mm×70 mm were cut out from the body portions of the multilayered containers which are the resin structures having a capacity of 500 g prepared by the methods described later. By using the solid-liquid interface analysis system, DropMaster 700 (manufactured by Kyowa Kaimen Kagaku Co.) under the condition of 23° C. 50% RH, the test pieces were so fixed that the inner layers thereof were facing upward. The fluid content of an amount of 70 mg was placed on each test piece and a slide-down behavior thereof at an inclination of 45' was photographed by using a camera. The slide-down behavior was analyzed, and the slide-down speed was calculated from the plots of moving distances vs. times. The slide-down speed was regarded to be an index of slide-down property. The larger the slide-down speed, the more excellent sliding property is exhibited for the content. There was used the following fluid content. The content was, further, measured for its viscosity at 25° C. by using a tuning fork oscillator type viscometer SV-10 (manufactured by A & D Co.).

Fluid content that was used:
 Kewpie-Half
  Produced by Kewpie Co., mayonnaise-like low-calorie food, Viscosity=1260 mPa·s.

4. Measuring the depth•thickness of the liquid diffusion prevention layer in the multilayered structure and the whole thickness thereof.

By using a polarizing microscope, the multilayered containers which are the resin structures formed by the methods described later were observed for their layer constitutions on horizontal cross section of the body portions thereof at a position 50 mm above the bottom of the containers, in an attempt to find the depth•thickness of the liquid diffusion prevention layer in the multilayered structures and the whole thickness thereof. The constitutions were observed at positions of 0°, 90°, 180° and 270° with respect to the cross section, and average values in the four directions were regarded to be the depth thickness of the liquid diffusion prevention layer in the multilayered structures and the whole thickness thereof.

5. Measuring the surface shapes of the resin structures.

Test pieces measuring 10 mm×10 mm were cut out from the body portions of the multilayered containers which are the resin structures having a capacity of 500 g prepared by the methods described later. By using the non-contact surface shape-measuring apparatus (NewView 7300, manufactured by zygo Co.), the surfaces of the resin structures were analyzed for their images and were measured for their shapes.

For the analysis of images and for the measurement of surface shapes, there was used the MetroPro (Ver. 9.1. 4 64-bit) as the application software.

Measurement was taken over a range of 1.40 mm×1.05 mm. From the raw data that were obtained, high-frequency components of wavelengths of not longer than 6.576 μm were cut off to remove noise, and the measurement data were obtained. From the measurement data, there were found density of protrusions (number of protrusions per an area of 1 mm$^2$) having a height of not less than 0.7 μm, average gap among the protrusions, maximum height of protrusions, average height of protrusions, and standard deviation in the height of protrusions.

<Liquid for Forming the Liquid Layer>
 Medium-chain fatty acid triglyceride (MCT)
 Surface tension: 28.8 mN/m (23° C.)
 Viscosity: 33.8 mPa·s (23° C.)
 Boiling point: 210° C. or higher
 Inflammation point: 242° C. (reference value)

The surface tension of the liquid was a value as measured at 23° C. by using the solid-liquid interface analyzing system DropMaster 700 (manufactured by Kyowa Kagaku Co.). Further, the density of the liquid necessary for measuring the surface tension of the liquid was a value as measured at 23° C. by using the density/specific gravity meter DA-130 (manufactured by Kyoto Denshi Kogyo Co.). Further, the viscosity of the lubricating liquid was a value as measured at 23° C. by using the tuning fork type viscometer SV-10 (manufactured by A and D Co.).

<Resin for Forming the Underlying Surface>
 Low-density polyethylene (LDPE)
 Density: 0.922 g/cm$^3$
 Crystallinity: 0.37

<Resin for Forming the Liquid Diffusion Prevention Layer>
 Ethylene•vinyl alcohol copolymer (EVOH)
 Density: 1.20 g/cm$^3$
 Tg: 60° C.

<Resin for Forming the Adhesive Layer>
 Maleic anhydride-modified polyethylene

<Base Member>
 Low-density polyethylene (LDPE)
 Density: 0.922 g/cm$^3$
 Crystallinity: 0.37

<Additives for Roughening the Surface>
 Hydrophobic silica
 Crosslinked polymethyl methacrylate A (crosslinked PMMA-A)
  Average particle diameter: 3 μm
 Crosslinked polymethyl methacrylate B (crosslinked PMMA-B)
  Average particle diameter: 20 μm
 Ultra-high-molecular-weight polyethylene (UHMWPE)
  Average particle diameter: 10 μm <Measuring the Crystallinity of the Resins>

Of the resins that were used, measurement was taken for the low-density polyethylene by using a differential scanning calorimeter (Diamond DSC manufactured by PERKIN ELMER Co.) under the following conditions to find its crystallinity.

The resin sample of an amount of about 7 mg was scanned from 25° C. up to 200° C. at a temperature-elevating rate of 10° C./min., held at 200° C. for 3 minutes, scanned from 200° C. down to −50° C. at a temperature-lowering rate of 10° C./min., and was held at −50° C. for 3 minutes. Thereafter, the heat of fusion (ΔH) of the resin was found from a profile obtained through the scanning of from −50° C. up to 200° C. at a temperature-elevating rate of 10° C./min. For the low-density polyethylene, the heat of fusion (ΔH) obtained through the measurement was divided by the heat of fusion (ΔH$^0$)=293 J/g of perfect crystals thereof to calculate the crystallinities.

Example 1

A resin composition comprising the following components was provided for forming the underlying layer:

| | |
|---|---|
| Low-density polyethylene (LDPE) | 95 parts by weight, |
| Additive for roughening the surface R972 manufactured by Nihon Aerosil Co. (hydrophobic silica coated with dimethylsilyl groups) | 1 part by weight, |

-continued

| | |
|---|---|
| Liquid for forming the liquid layer Medium-chain fatty acid triglyceride (MCT). | 4 parts by weight, |

Into a 40-mm extruder was fed the above resin composition for forming the underlying layer, into a 30-mm extruder A was fed a resin for forming the adhesive layer (maleic anhydride-modified polyethylene), into a 30-mm extruder B was fed a resin for forming the liquid diffusion prevention layer (ethylenevinyl alcohol copolymer), and into a 50-mm extruder was fed a resin for forming the base member (low-density polyethylene). A molten parison thereof was extruded through a multilayer die head heated at a temperature of 210° C., and was directly blow-formed at a metal mold temperature of 20° C. to prepare a container of a multilayered structure having a capacity of 500 g and weighing 20 g.

The obtained bottle was measured for its covering ratio with the liquid layer, for its amount of the liquid layer that is covering, for its slide-down speed of the fluid content, for its depth·thickness of the liquid diffusion prevention layer, for its whole thickness and, further, the inner surface of the container was observed.

Figure 5A:
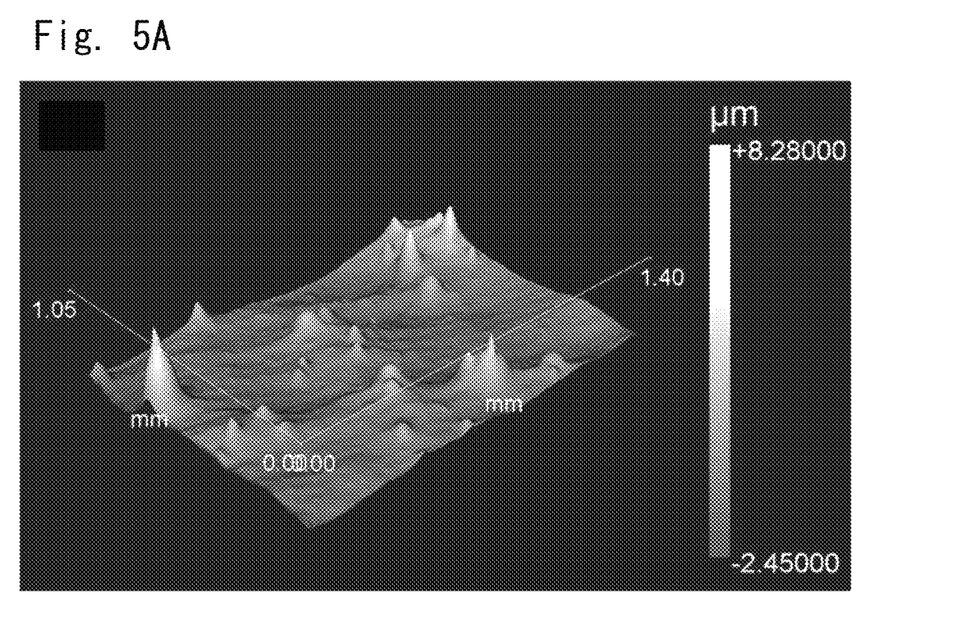
FIG. 5A is a view showing the results of observing the surface of a resin formed body of Example 1 by using a scanning white light interferometer, and is a view of a three-dimensional image of the surface.
Figure 5B:
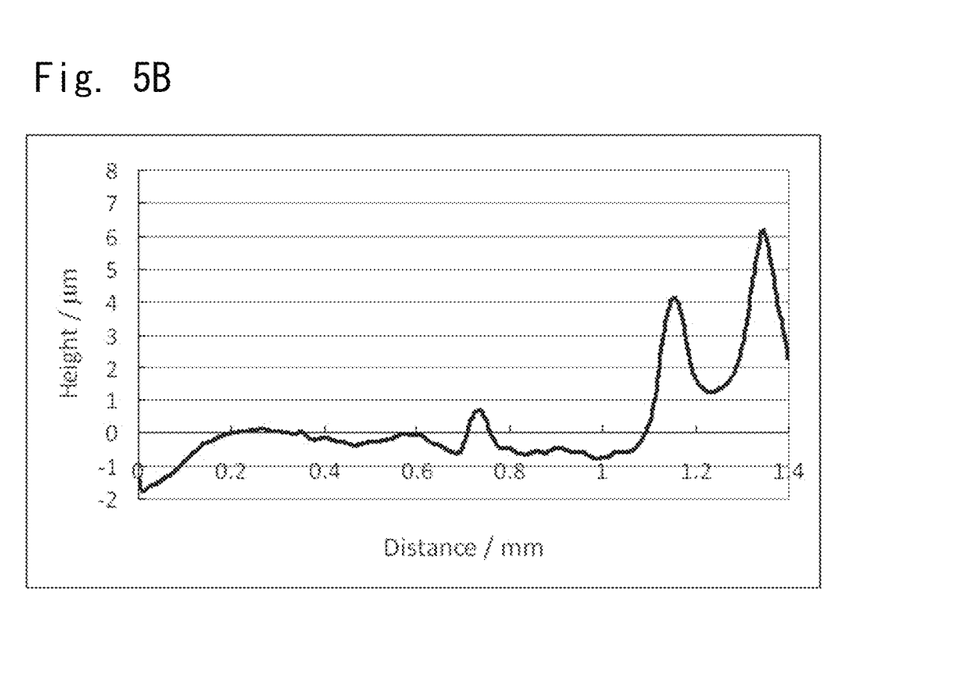
FIG. 5B is a view showing the results of observing the surface of the resin formed body of Example 1 by using the scanning white light interferometer, and is a view of a shape profile of the cross section.

FIGS. 5A and 5B show a three-dimensional image of the surface shape that is obtained and a shape profile of a given cross section.

In the stage of one-day period after the formation, it was confirmed from the measured covering ratio with the liquid layer that a liquid layer had been formed on the surface of the formed multilayered structure.

Further, the container that was formed was stored for a predetermined period of time under a condition of 22° C.60% RH, and was, thereafter, measured for the covering ratio of with the liquid layer and the slide-down speed of the fluid content. The results were as collectively shown in Table 1.

The container of the multilayered structure possessed the following layer constitution with the liquid layer as the inner surface.

Liquid layer/underlying layer (35)/adhesive layer (10)/ liquid diffusion prevention layer (20)/adhesive layer (10)/base member (340),
depth of the liquid diffusion prevention layer (45),
whole thickness (415).

Here, numerals in parentheses represent thicknesses of the layers (unit in microns, the same holds hereinafter).

Example 2

A resin composition comprising the following components was provided for forming the underlying layer:

| | |
|---|---|
| Low-density polyethylene (LDPE) | 94.7 parts by weight, |
| Additive for roughening the surface crosslinked PMMA-A | 0.3 parts by weight, |
| Liquid for forming the liquid layer Medium-chain fatty acid triglyceride (MCT). | 5 parts by weight, |

A container of the multilayered structure was prepared in the same manner as in Example 1 but using the above resin composition for forming the underlying layer. The prepared container was measured in the same manner as in Example 1. The results were as collectively shown in Table 1.

The container possessed the following layer constitution with the liquid layer as the inner surface.

Liquid layer/underlying layer (80)/adhesive layer (10)/ liquid diffusion prevention layer (25)/adhesive layer (10)/base member (370),
depth of the diffusion prevention layer (90),
whole thickness (495).

Example 3

A resin composition comprising the following components was provided for forming the underlying layer:

| | |
|---|---|
| Low-density polyethylene (LDPE) | 94 parts by weight, |
| Additive for roughening the surface crosslinked PMMA-B | 1 part by weight, |
| Liquid for forming the liquid layer Medium-chain fatty acid triglyceride (MCT). | 5 parts by weight, |

A container of the multilayered structure was prepared in the same manner as in Example 1 but using the above resin composition for forming the underlying layer. The prepared container was measured in the same manner as in Example 1. The results were as collectively shown in Table 1.

The container possessed the following layer constitution with the liquid layer as the inner surface.

Liquid layer/underlying layer (80)/adhesive layer (10)/ liquid diffusion prevention layer (20)/adhesive layer (10)/base member (300),
depth of the diffusion prevention layer (90),
whole thickness (420).

Example 4

A resin composition comprising the following components was provided for forming the underlying layer:

| | |
|---|---|
| Low-density polyethylene (LDPE) | 92 parts by weight, |
| Additive for roughening the surface crosslinked PMMA-B | 3 parts by weight, |
| Liquid for forming the liquid layer Medium-chain fatty acid triglyceride (MCT). | 5 parts by weight, |

A container of the multilayered structure was prepared in the same manner as in Example 1 but using the above resin composition for forming the underlying layer. The prepared container was measured in the same manner as in Example 1. The results were as collectively shown in Table 1.

The container possessed the following layer constitution with the liquid layer as the inner surface.

Liquid layer/underlying layer (80)/adhesive layer (10)/ liquid diffusion prevention layer (20)/adhesive layer (10)/base member (350),
depth of the diffusion prevention layer (90),
whole thickness (470).

Example 5

A resin composition comprising the following components was provided for forming the underlying layer:

| | |
|---|---|
| Low-density polyethylene (LDPE) | 94.5 parts by weight, |
| Additive for roughening the surface ultra-high-molecular-weight PE (UHMWPE) | 0.5 parts by weight, |
| Liquid for forming the liquid layer Medium-chain fatty acid triglyceride (MCT). | 5 parts by weight, |

A container of the multilayered structure was prepared in the same manner as in Example 1 but using the above resin composition for forming the underlying layer. The prepared container was measured in the same manner as in Example 1. The results were as collectively shown in Table 1.

The container possessed the following layer constitution with the liquid layer as the inner surface.

Liquid layer/underlying layer (80)/adhesive layer (15)/ liquid diffusion prevention layer (25)/adhesive layer (10)/base member (340),
depth of the diffusion prevention layer (95),
whole thickness (470).

Example 6

A resin composition comprising the following components was provided for forming the underlying layer:

| | |
|---|---|
| Low-density polyethylene (LDPE) | 94 parts by weight, |
| Additive for roughening the surface ultra-high-molecular-weight PE (UHMWPE) | 1 part by weight, |
| Liquid for forming the liquid layer Medium-chain fatty acid triglyceride (MCT). | 5 parts by weight, |

A container of the multilayered structure was prepared in the same manner as in Example 1 but using the above resin composition for forming the underlying layer. The prepared container was measured in the same manner as in Example 1. The results were as collectively shown in Table 1.

The container possessed the following layer constitution with the liquid layer as the inner surface.

Liquid layer/underlying layer (85)/adhesive layer (10)/ liquid diffusion prevention layer (25)/adhesive layer (10)/base member (350),
depth of the diffusion prevention layer (95),
whole thickness (480).

Comparative Example 1

A resin composition comprising the following components was provided for forming the underlying layer:

| | |
|---|---|
| Low-density polyethylene (LDPE) | 96 parts by weight, |
| Liquid for forming the liquid layer Medium-chain fatty acid triglyceride (MCT). | 4 parts by weight, |

Figure 6A:
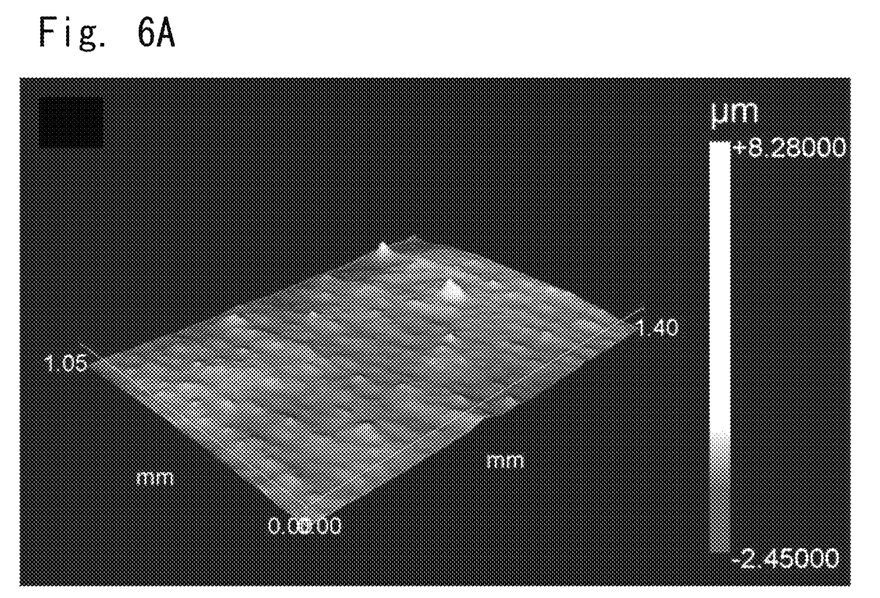
FIG. 6A is a view showing the results of observing the surface of a resin formed body of Comparative Example 1 by using the scanning white light interferometer, and is a view of a three-dimensional image of the surface.
Figure 6B:
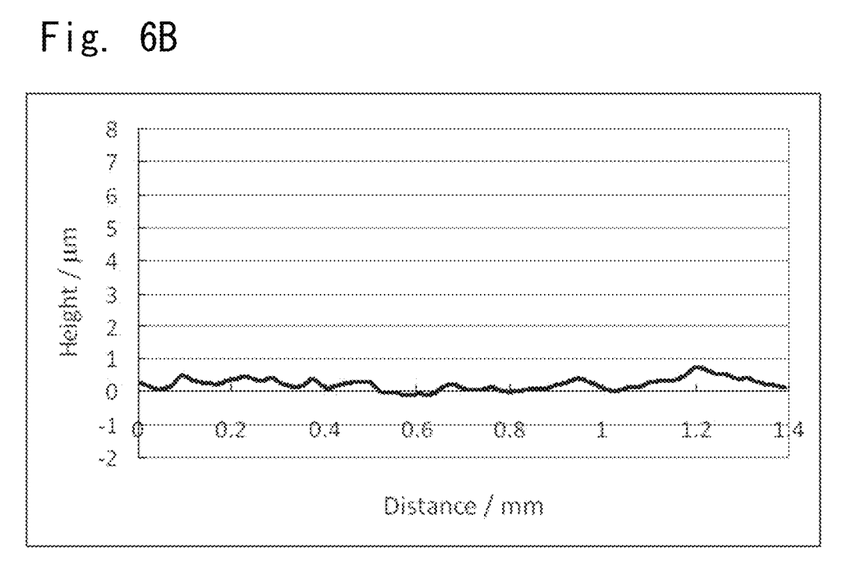
FIG. 6B is a view showing the results of observing the surface of the resin formed body of Comparative Example 1 by using the scanning white light interferometer, and is a view of a shape profile of the cross section.

A container of the multilayered structure was prepared in the same manner as in Example 1 but using the above resin composition for forming the underlying layer. The prepared container was measured in the same manner as in Example 1. The results were as collectively shown in Table 1. Further, FIGS. 6A and 6B show a three-dimensional image of the surface shape that was obtained by observing the inner surface of the container (resin structure) and a shape profile of a given cross section.

The container possessed the following layer constitution with the liquid layer as the inner surface.

Liquid layer/underlying layer (40)/adhesive layer (10)/ liquid diffusion prevention layer (20)/adhesive layer (10)/ base member (320),
depth of the diffusion prevention layer (50),
whole thickness (400).

Comparative Example 2

A resin composition comprising the following components was provided for forming the underlying layer:

| | |
|---|---|
| Low-density polyethylene (LDPE) | 95 parts by weight, |
| Liquid for forming the liquid layer Medium-chain fatty acid triglyceride (MCT). | 5 parts by weight, |

A container of the multilayered structure was prepared in the same manner as in Example 1 but using the above resin composition for forming the underlying layer. The prepared container was measured in the same manner as in Example 1. The results were as collectively shown in Table 1.

The container possessed the following layer constitution with the liquid layer as the inner surface.

Liquid layer/underlying layer (50)/adhesive layer (10)/ liquid diffusion prevention layer (10)/adhesive layer (10)/ base member (335),
depth of the diffusion prevention layer (60),
whole thickness (415).

TABLE 1

Layer constitution of the multilayered structure:
liquid layer/underlying layer/adhesive layer/liquid diffusion prevention layer/adhesive layer/base member

| | Resin composition for forming the underlying surface (weight ratio) | | | | | Surface shape measured | | | | |
|---|---|---|---|---|---|---|---|---|---|---|
| | LDPE | Hydrophobic silica | Crosslinked PMMA | UHMWPE | MCT | *1 prot./mm² | *2 µm | *3 µm | *4 µm | *5 µm |
| Ex. 1 | 95 | 1 | | | 4 | 30.9 | 179.8 | 10.70 | 1.69 | 1.69 |
| Ex. 2 | 94.7 | | 0.3 | | 5 | 32.3 | 175.8 | 1.86 | 0.93 | 0.23 |
| Ex. 3 | 94 | | 1 | | 5 | 27.4 | 190.9 | 4.89 | 1.67 | 1.13 |
| Ex. 4 | 92 | | 3 | | 5 | 87.3 | 107.0 | 6.53 | 3.27 | 1.91 |
| Ex. 5 | 94.5 | | | 0.5 | 5 | 39.4 | 159.3 | 5.58 | 1.14 | 0.77 |
| Ex. 6 | 94 | | | 1 | 5 | 49.9 | 141.5 | 7.21 | 1.33 | 1.03 |
| Comp. Ex. 1 | 96 | | | | 4 | 9.8 | 318.7 | 2.33 | 1.06 | 0.45 |
| Comp. Ex. 2 | 95 | | | | 5 | 17.6 | 238.5 | 2.47 | 0.98 | 0.47 |

| | Amount of liq. | Coverting ratio F | | | | | Slide-down speed (Kewpie-Half) mm/min | | | | |
|---|---|---|---|---|---|---|---|---|---|---|---|
| | Layer covering g/m² | 1 day | 5 days | 7 days | 14 days | 28 days | 1 day | 5 days | 7 days | 14 days | 28 days |
| Ex. 1 | 0.95 | 0.93 | 0.99 | | 0.99 | 0.98 | 8.6 | 13.7 | | 16.1 | 17.8 |
| Ex. 2 | 1.43 | 0.90 | | 0.93 | 0.90 | 0.87 | 5.7 | | 14.0 | 12.1 | 9.4 |

TABLE 1-continued

Layer constitution of the multilayered structure:
liquid layer/underlying layer/adhesive layer/liquid diffusion prevention layer/adhesive layer/base member

| | | | | | | | | | |
|---|---|---|---|---|---|---|---|---|---|
| Ex. 3 | 1.63 | 0.93 | 0.92 | 0.89 | 0.97 | 7.7 | 18.5 | 16.3 | 12.6 |
| Ex. 4 | 1.68 | 0.95 | 0.95 | 0.92 | | 5.9 | 12.3 | 13.4 | |
| Ex. 5 | 1.33 | | | | | 6.9 | 13.0 | 12.5 | |
| Ex. 6 | 1.44 | | | | | 5.5 | 13.0 | 12.5 | |
| Comp. Ex. 1 | 0.63 | 0.83 | | 0.81 | 0.87 | 3.3 | | 6.0 | 5.5 |
| Comp. Ex. 2 | 0.92 | 0.87 | | 0.84 | 0.85 | 6.4 | | 8.5 | 7.1 |

In Table, blanks represent no relevant data or no data measured.
*1: Protrusion density of higher than 0.7 μm,
*2: Average gap among protrusions,
*3: Maximum height of protrusions,
*4: Average height of protrusions,
*5: Standard deviation of the height of protrusions From Table 1 and from the results of surface shape measurements shown in FIGS. 5 and 6, it is learned that in Examples 1 to 6, the fine protrusions of heights of not less than 0.7 μm are present at a density in a range of 20 to 100 protrusions per mm$^2$ and the average gap L among the protrusions is in a range of 100 to 300 μm. From the results of the covering ratio with the liquid layer, further, it is confirmed that the surface is covered with the liquid layer at a ratio of not less than 0.80. In Comparative Examples 1 and 2, on the other hand, the density of fine protrusions of heights of not less than 0.7 μm is less than 20 protrusions per mm$^2$ and the covering ratio with the liquid layer is not less than 0.80.

The slide-down speeds on the surfaces are not less than 12 mm/min. (18.5 mm/min. at the greatest) in all of Examples 1 to 6 in which the liquid layer was formed on the surface on where the fine protrusions of heights of not less than 0.7 μm were present at a density in a range of 20 to 100 protrusions per mm$^2$ and the average gap L among the protuberances was in a range of 100 to 300 μm. On the other hand, in Comparative Examples 1 and 2 in which the liquid layer was formed on the surfaces on where the density of fine protrusions of heights of not less than 0.7 μm was less than 2 protrusions per mm$^2$, the slide-down speed was 8.5 mm/min. at the greatest. It is, therefore, learned that the slide-down speed is improved in Examples 1 to 6.

In the present invention as described above, locally protruded portions (liquid protrusions) are formed on the surface of the liquid layer. It is, therefore, considered that the area of contact to the fluid content has decreased, the frictional force to the content has decreased and, accordingly, excellent sliding property was expressed.

DESCRIPTION OF REFERENCE NUMERALS

1: resin formed body
3: liquid layer
3a: liquid protrusions
5: substance
10: resin structure
20: liquid diffusion prevention layer
23: base member
25: liquid diffusion adjustment layer
30: multilayered structure

The invention claimed is:

1. A resin structure comprising a resin formed body and a liquid layer formed on a surface of said resin formed body, said liquid layer having protruded portions that are locally protruded on the surface thereof, wherein
(a) the liquid forming the liquid layer has a boiling point of not lower than 200° C.,
(b) the surface of the liquid layer has the protruded portions that are locally protruded as well as flat surfaces present among the protruded portions,
(c) the protruded portions that are locally protruded on the surface of the liquid layer are portions which reflect protrusions formed on the surface of the resin formed body on which the liquid layer is formed,
(d) said protruded portions have a height (Δh) of not less than 0.7 μm and are distributed at a density of 20 to 100 protruded portions/mm$^2$,
(e) said protruded portions are present on the surface of said liquid layer maintaining a gap of 107.0 to 300 μm on the average, wherein the gap is an average spacing between protruded portions,
(f) the resin formed body is a container, and the surface of the resin formed body on which the liquid layer is formed is a resin layer forming the inner surface of the container, said liquid being dispersed in said resin layer,
(g) said container contains a viscous content,
(h) said liquid forming the liquid layer is a lubricating liquid for improving a sliding property to said viscous content, and
(i) said viscous content partly but not entirely contacts the liquid layer at said protruded portions.

2. The resin structure according to claim 1, wherein said liquid layer is present on the surface of said resin formed body in an amount of 0.5 to 30 g/m$^2$.

3. The resin structure according to claim 1, wherein the resin layer includes fine particles having an average particle diameter of not more than 40 μm dispersed therein.

4. The resin structure according to claim 3, wherein said fine particles are one or more particles selected from the group consisting of silica, polyethylene, polymethyl methacrylate, and silicone particles.

5. The resin structure according to claim 3, wherein said fine particles are dispersed in an amount of 0.1 to 30 parts by weight per 100 parts by weight of the resin which forms the resin layer.

6. The resin structure according to claim 1, wherein the protruded portions are distributed at a density of 20 to 87.3 protruded portions/mm$^2$.

* * * * *